US010477151B2

(12) United States Patent
Cocchi et al.

(10) Patent No.: US 10,477,151 B2
(45) Date of Patent: Nov. 12, 2019

(54) METHOD AND APPARATUS FOR SUPPORTING MULTIPLE BROADCASTERS INDEPENDENTLY USING A SINGLE CONDITIONAL ACCESS SYSTEM

(71) Applicant: Sypermedia International, Inc., Aliso Viejo, CA (US)

(72) Inventors: Ronald P. Cocchi, Seal Beach, CA (US); Gregory J. Gagnon, Redondo Beach, CA (US); Dennis R. Flaharty, Shingle Springs, CA (US); Michael A. Gorman, Cypress, CA (US); Jacob T. Carson, Long Beach, CA (US); Matthew A. Skubiszewski, Hermosa Beach, CA (US)

(73) Assignee: INSIDE SECURE, Meyreuil (FR)

( * ) Notice: Subject to any disclaimer, the term of this patent is extended or adjusted under 35 U.S.C. 154(b) by 172 days.

(21) Appl. No.: 15/652,082

(22) Filed: Jul. 17, 2017

(65) Prior Publication Data

US 2017/0318263 A1 Nov. 2, 2017

Related U.S. Application Data

(63) Continuation-in-part of application No. 14/692,500, filed on Apr. 21, 2015, now Pat. No. 9,712,786, (Continued)

(51) Int. Cl.
*H04L 9/38* (2006.01)
*H04L 9/00* (2006.01)
(Continued)

(52) U.S. Cl.
CPC ........... *H04N 7/1675* (2013.01); *H04N 7/163* (2013.01); *H04N 7/165* (2013.01);
(Continued)

(58) Field of Classification Search
CPC ...... H04N 7/1675; H04N 7/163; H04N 7/165; H04N 7/17318; H04N 21/2543;
(Continued)

(56) References Cited

U.S. PATENT DOCUMENTS

| 4,757,534 A | 7/1988 | Matyas et al. |
| 5,790,663 A | 8/1998 | Lee et al. |

(Continued)

FOREIGN PATENT DOCUMENTS

| EP | 1555822 | 7/2005 |
| EP | 1575291 | 9/2005 |

(Continued)

OTHER PUBLICATIONS

Jean-Luc Giachetti; A Common Conditional Access Interface for Digital Video Broadcasting Decoders ; IEEE Transactions on Consumer Electronics, vol. 41, No. 3, Aug. 1995; p. 836-841 (Year: 1995).*

(Continued)

*Primary Examiner* — Monjur Rahim
(74) *Attorney, Agent, or Firm* — Gates & Cooper LLP

(57) ABSTRACT

A method and apparatus for brokering the enablement of the communication of encrypted media programs from a plurality of independent broadcasters to a plurality of receivers is disclosed. The system makes use of a pairing key for each provided service, which is differently encrypted by a pairing server and by the broadcaster providing the service. The encrypted versions of the pairing key are decrypted in a first receiver module using information known to the pairing service but not the broadcaster and in a second receiver module using information known to the broadcaster. The pairing key is used to cryptographically bind the first and second receiver modules.

30 Claims, 12 Drawing Sheets

Related U.S. Application Data which is a continuation of application No. 13/541,492, filed on Jul. 3, 2012, now Pat. No. 9,014,375, which is a continuation of application No. 11/795,272, filed as application No. PCT/US2005/037197 on Oct. 18, 2005, now Pat. No. 8,243,925.

(60) Provisional application No. 60/619,663, filed on Oct. 18, 2004, provisional application No. 62/446,196, filed on Jan. 13, 2017.

(51) Int. Cl.
| | | |
|---|---|---|
| *H04K 1/00* | (2006.01) | |
| *H04N 7/167* | (2011.01) | |
| *H04N 21/472* | (2011.01) | |
| *H04N 21/4367* | (2011.01) | |
| *H04N 21/426* | (2011.01) | |
| *H04N 21/418* | (2011.01) | |
| *H04N 21/266* | (2011.01) | |
| *H04N 7/16* | (2011.01) | |
| *H04N 21/2543* | (2011.01) | |
| *H04N 7/173* | (2011.01) | |
| *H04N 21/258* | (2011.01) | |

(52) U.S. Cl.
CPC ..... *H04N 7/17318* (2013.01); *H04N 21/2543* (2013.01); *H04N 21/25866* (2013.01); *H04N 21/26606* (2013.01); *H04N 21/4181* (2013.01); *H04N 21/42684* (2013.01); *H04N 21/4367* (2013.01); *H04N 21/472* (2013.01)

(58) Field of Classification Search
CPC ....... H04N 21/25866; H04N 21/26606; H04N 21/4181; H04N 21/42684; H04N 21/472
USPC .......................................................... 380/27
See application file for complete search history.

(56) References Cited

U.S. PATENT DOCUMENTS

| | | | |
|---|---|---|---|
| 5,940,504 | A | 8/1999 | Griswold |
| 6,240,401 | B1 | 5/2001 | Oren et al. |
| 6,243,468 | B1 | 6/2001 | Pearce et al. |
| 6,285,774 | B1 | 9/2001 | Schumann et al. |
| 6,393,128 | B1 | 5/2002 | Rix et al. |
| 6,550,011 | B1 | 4/2003 | Sims, III |
| 6,681,212 | B1 | 1/2004 | Zeng |
| 6,931,545 | B1 | 8/2005 | Ta et al. |
| 6,957,344 | B1 | 10/2005 | Goldshlag et al. |
| 7,007,170 | B2 | 2/2006 | Morten |
| 7,174,512 | B2 | 2/2007 | Martin et al. |
| 7,295,681 | B2 | 11/2007 | Lubin et al. |
| 7,328,345 | B2 | 2/2008 | Morten et al. |
| 7,356,143 | B2 | 4/2008 | Morten |
| 7,376,233 | B2 | 5/2008 | Candelore et al. |
| 7,409,562 | B2 * | 8/2008 | Kahn ................... H04N 7/1675 713/194 |
| 7,548,624 | B2 | 6/2009 | Kahn et al. |
| 7,565,546 | B2 * | 7/2009 | Candelore .............. H04N 7/163 380/200 |
| 7,580,523 | B2 | 8/2009 | Kahn et al. |
| 7,599,494 | B2 | 10/2009 | Kahn et al. |
| 7,684,409 | B2 | 3/2010 | Godwin et al. |
| 7,797,552 | B2 * | 9/2010 | Kahn ..................... H04N 7/163 713/193 |
| 2002/0018568 | A1 | 2/2002 | Weaver, III et al. |
| 2002/0021805 | A1 | 2/2002 | Schumann et al. |
| 2002/0067914 | A1 | 6/2002 | Schumann et al. |
| 2002/0094084 | A1 | 7/2002 | Wasilewski et al. |
| 2003/0026433 | A1 | 2/2003 | Matt |
| 2003/0046568 | A1 | 3/2003 | Riddick et al. |
| 2003/0061477 | A1 | 3/2003 | Kahn et al. |
| 2003/0188164 | A1 | 10/2003 | Okimoto et al. |
| 2004/0010717 | A1 | 1/2004 | Simec et al. |
| 2004/0034582 | A1 | 2/2004 | Gilliam et al. |
| 2004/0039704 | A1 | 2/2004 | Gilliam et al. |
| 2004/0044891 | A1 | 3/2004 | Hanzlik et al. |
| 2004/0078575 | A1 | 4/2004 | Morten et al. |
| 2004/0107356 | A1 | 6/2004 | Shamoon et al. |
| 2004/0133803 | A1 | 7/2004 | Rabin et al. |
| 2004/0184616 | A1 | 9/2004 | Morten |
| 2005/0005098 | A1 | 1/2005 | Michaelis et al. |
| 2005/0172122 | A1 | 8/2005 | Risan et al. |
| 2005/0278257 | A1 | 12/2005 | Barr et al. |
| 2006/0005253 | A1 | 1/2006 | Goldshlag et al. |
| 2006/0010500 | A1 | 1/2006 | Elazar et al. |
| 2006/0101287 | A1 | 5/2006 | Morten |
| 2006/0143481 | A1 | 6/2006 | Morten |
| 2006/0159303 | A1 | 7/2006 | Davis et al. |
| 2006/0239503 | A1 | 10/2006 | Petrovic et al. |
| 2007/0033419 | A1 | 2/2007 | Kocher et al. |
| 2008/0279386 | A1 | 11/2008 | Kahn et al. |
| 2015/0113278 | A1 | 4/2015 | Cocchi et al. |
| 2017/0012952 | A1 | 1/2017 | Cocchi et al. |

FOREIGN PATENT DOCUMENTS

| | | |
|---|---|---|
| EP | 1585329 | 10/2005 |
| WO | 1999043120 | 8/1999 |
| WO | 99/53689 | 10/1999 |
| WO | 02/01333 | 1/2002 |

OTHER PUBLICATIONS

PCT International Search Report & Written Opinion dated Sep. 26, 2018 for PCT Application No. PCT/US2018/042542.
EP Further Examination Report (contained in a Summons to attend oral proceedings) dated Feb. 28, 2014 for European Application No. 05811812.6.
EP Office Action dated Jan. 13, 2011, Application No. 05811812.6.
Response to EP Office Action dated Jan. 13, 2011.
PCT/US2005/037197 International Search Report and Written Opinion.
Cinea press release "Cinea, Inc. to Provide IFE Key Management Servies for Universal Pictures and Twentieth Century Fox" Sep. 9, 2003.
ORM Watch Magazine Article "Cinea DRM for DVDs Endorsed for Oscar Screeners", Jul. 8, 2004.
Digital lifestyles Magazine Article "Secure DVD Players for BAFTA Judges", Aug. 31, 2004.

* cited by examiner

| STB ID | $S_1$ | BDCST ID | GEN SRVC | IPPV | OPPV A | OPPV B |
|---|---|---|---|---|---|---|
| A1A1 | #1 | A | $Kp_{0001}$ | $Kp_{0002}$ | $Kp_{0003}$ | $Kp_{0004}$ |
| A1A1 | #1 | B | $Kp_{0201}$ | $Kp_{0202}$ | $Kp_{0203}$ | $Kp_{0204}$ |
| A1A2 | #2 | A | $Kp_{0301}$ | $Kp_{0302}$ | $Kp_{0303}$ | $Kp_{0404}$ |
| A1A3 | #3 | B | $Kp_{0401}$ | $Kp_{0402}$ | $Kp_{0403}$ | $Kp_{0404}$ |
| A1A4 | #4 | A | $Kp_{0501}$ | $Kp_{0502}$ | $Kp_{0503}$ | $Kp_{0504}$ |
| ... | ... | ... | ... | ... | ... | ... |
| Z9Z9 | ## | A | $Kp$ | $Kp$ | $Kp$ | $Kp$ |

FIG. 5B

| STB ID | BDCST ID = A | GEN SRVC | IPPV | OPPV A | OPPV B |
|---|---|---|---|---|---|
| A1A1 | A | $Kp_{0001}$ | $Kp_{0002}$ | $Kp_{0003}$ | $Kp_{0004}$ |
| A1A2 | A | $Kp_{0301}$ | $Kp_{0302}$ | $Kp_{0303}$ | $Kp_{0304}$ |
| Z1A1 | A | $Kp_{1301}$ | $Kp_{1302}$ | $Kp_{1303}$ | $Kp_{1404}$ |
| A112 | A | $Kp_{1401}$ | $Kp_{1402}$ | $Kp_{1403}$ | $Kp_{1404}$ |
| A1A5 | A | $Kp_{1501}$ | $Kp_{1502}$ | $Kp_{1503}$ | $Kp_{1504}$ |
| ... | ... | ... | ... | ... | ... |
| Z9Z9 | A | $Kp$ | $Kp$ | $Kp$ | $Kp$ |

METHOD AND APPARATUS FOR SUPPORTING MULTIPLE BROADCASTERS INDEPENDENTLY USING A SINGLE CONDITIONAL ACCESS SYSTEM

CROSS-REFERENCE TO RELATED APPLICATIONS

This application is a continuation-in-part of U.S. patent application Ser. No. 14/692,500, entitled "METHOD AND APPARATUS FOR SUPPORTING MULTIPLE BROADCASTERS INDEPENDENTLY USING A SINGLE CONDITIONAL ACCESS SYSTEM," by Ronald P. Cocchi, Gregory J. Gagnon, and Dennis R. Flaharty, filed Apr. 21, 2015, now issued as U.S. Pat. No. 9,014,375, which application is a continuation of U.S. patent application Ser. No. 13/541,492, entitled "METHOD AND APPARATUS FOR SUPPORTING MULTIPLE BROADCASTERS INDEPENDENTLY USING A SINGLE CONDITIONAL ACCESS SYSTEM," by Ronald P. Cocchi, Gregory J. Gagnon, and Dennis R. Flaharty, filed Jul. 3, 2012, now issued as U.S. Pat. No. 9,014,375, which application is a continuation of U.S. patent application Ser. No. 11/795,272, entitled "METHOD AND APPARATUS FOR SUPPORTING MULTIPLE BROADCASTERS INDEPENDENTLY USING A SINGLE CONDITIONAL ACCESS SYSTEM," by Ronald P. Cocchi, Gregory J. Gagnon, and Dennis R. Flaharty, filed Jul. 13, 2007, now issued as U.S. Pat. No. 8,243,925, which is a national phase application of International Patent application No.: PCT/US2005/037197, entitled "METHOD AND APPARATUS FOR SUPPORTING MULTIPLE BROADCASTERS INDEPENDENTLY USING A SINGLE CONDITIONAL ACCESS SYSTEM," by Ronald P. Cocchi, Gregory J. Gagnon, and Dennis R. Flaharty, filed Oct. 18, 2005, which claims benefit of U.S. Provisional Patent Application No. 60/619,663, entitled "METHOD OF SUPPORTING MULTIPLE BROADCASTERS INDEPENDENTLY USING A SINGLE CONDITIONAL ACCESS SYSTEM," by Ronald P. Cocchi, Gregory J. Gagnon, and Dennis R. Flaharty, filed Oct. 18, 2004, all of which applications are hereby incorporated by reference herein.

This application also claims benefit of U.S. Provisional Patent application No. 62/446,196, entitled "SIGNALING METHOD FOR CAS SWITCHING AND KFY DERIVATION," by Ronald P. Cocchi et al., filed Jan. 13, 2017, which is also incorporated by reference herein.

This application is also related to U.S. patent application Ser. No. 15/207,332, entitled "METHOD AND APPARATUS FOR A BLACKBOX PROGRAMMING SYSTEM PERMITTING DOWNLOADABLE APPLICATIONS AND MULTIPLE SECURITY PROFILES PROVIDING HARDWARE SEPARATION OF SERVICES IN HARDWARE CONSTRAINED DEVICES," by Ronald P. Cocchi et al, filed Jul. 11, 2016, which application claims benefit of U.S. Provisional Patent Application No. 62/191,200, entitled "METHOD AND APPARATUS FOR A BLACKBOX PROGRAMMING SYSTEM PERMITTING DOWNLOADABLE APPLICATIONS AND MULTIPLE SECURITY PROFILES PROVIDING HARDWARE SEPARATION OF SERVICES IN HARDWARE CONSTRAINED DEVICES," by Ronald P. Cocchi et al, filed Jul. 10, 2015, both of which applications are which is hereby incorporated by reference.

BACKGROUND OF THE INVENTION

1. Field of the Invention

The present invention relates to systems and methods for providing conditional access to media programs, and in particular to a system and method for providing for such conditional access between multiple independent broadcasters and a plurality of customers using a single conditional access system.

2. Description of the Related Art

For many years, media programs such as television and radio programs have been broadcast to viewers/listeners free of charge. More recently, this free-of-charge dissemination model has been augmented with a fee-for-service and/or fee-for-view model in which paying subscribers are provided access to a greater variety and number of media programs, including video programs, audio programs and the like, by cable, satellite and terrestrial broadcasts.

However, while subscriber-based services are readily available in some areas, they are not available on a worldwide basis. Further, in current media program subscription business models, subscribers are typically offered services from a small number of providers (e.g. DIRECTV or ECHOSTAR, or the approved local cable provider) each of which typically provide a large number of media channels from a variety of sources (e.g. ESPN, HBO, COURT TV, HISTORY CHANNEL). To assure that only subscribers receive the media programs, each service provider typically encrypts the program material and provides equipment necessary for the customer to decrypt them so that they can be viewed.

Since they provide a large number of programs and typically at a relatively high cost, the vast majority of customers subscribe to only one of the foregoing services (e.g. DIRECTV, ECHOSTAR, or the local cable provider), but not multiple providers. It is expected that future business models will evolve to the point where customers will subscribe to more than one media provider, each of which provides a smaller number of media channels. The foregoing is especially true in areas where subscriber-based services are in their infancy, including for example, large parts of Asia, Africa, and South America.

One of the roadblocks to the evolution of such services is the means by which the service provider assures that only paying customers receive their media programs. Existing conditional access systems are not compatible with each other, and it is thought to be prohibitively expensive for each provider of a limited number of media programs to produce and provide its own conditional access system to potential subscribers. Another problem is that customers would typically prefer to receive all media programs through a single device (and hence, a single conditional access system), rather than multiple such systems. Accordingly, there is a need in the art for a method and apparatus that allows multiple program providers (e.g. broadcasters) to transmit media programs to paying subscribers via a single conditional access system. The present invention satisfies that need.

SUMMARY OF THE INVENTION

To address the requirements described above, the present invention discloses a method, apparatus, article of manufacture for brokering the enabling of communication of encrypted media programs from a plurality of independent broadcasters to a plurality of receivers, each encrypted media program decryptable by a first receiver module securely communicating with a second receiver module according to a pairing key associated with one of the plurality of receivers. In one disclosed embodiment, the method comprises the steps of transmitting a service enabling request from one of the plurality of broadcasters to a broker independent from the one of the plurality of broadcasters, the request comprising an identification of the one of the plurality of receivers; receiving a first encrypted version of the pairing key $E_{S_1}[K_p]$ from the broker, the first encrypted version of the pairing key $E_{S_1}[K_p]$ decryptable by first information $S_1$ securely stored in the first receiver module of the one of the plurality of receivers; generating a second encrypted version of the pairing key $K_p$, the second encrypted version of the pairing key $E_{S_2}[K_p]$ decryptable by second information $S_2$ securely stored in the second receiver module; and transmitting the first encrypted version of the pairing key $E_{S_1}[K_p]$ and the second encrypted version of the pairing key $E_{S_2}[K_p]$ to the one of the plurality of receivers. In another disclosed embodiment, the apparatus is described by system for brokering the enabling of communication of encrypted media programs from a plurality of independent broadcasters to a plurality of receivers, each encrypted media program decryptable by a first receiver module securely communicating with a second receiver module according to a pairing key $K_p$ associated with one of the plurality of receivers. The system comprises a broker, for providing a first encrypted version of the pairing key $E_{S_1}[K_p]$ in response to a service enabling request from one of the plurality of broadcasters, the service request having an identification of one of the plurality of receivers, wherein the first encrypted version of the pairing key $E_{S_1}[K_p]$ is decryptable by first information $S_1$ stored in the first receiver module. In each of these embodiments, at least one of the first information $S_1$ and the second information $S_2$ may be derived from a hardware root of trust stored in at least one of the first receiver module and the second receiver module

BRIEF DESCRIPTION OF THE DRAWINGS

Referring now to the drawings in which like reference numbers represent corresponding parts throughout:

FIG. 5B is a diagram illustrating an embodiment of a table stored in the pairing system;

FIG. 5C is a diagram illustrating an embodiment of a table stored by the service provider;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
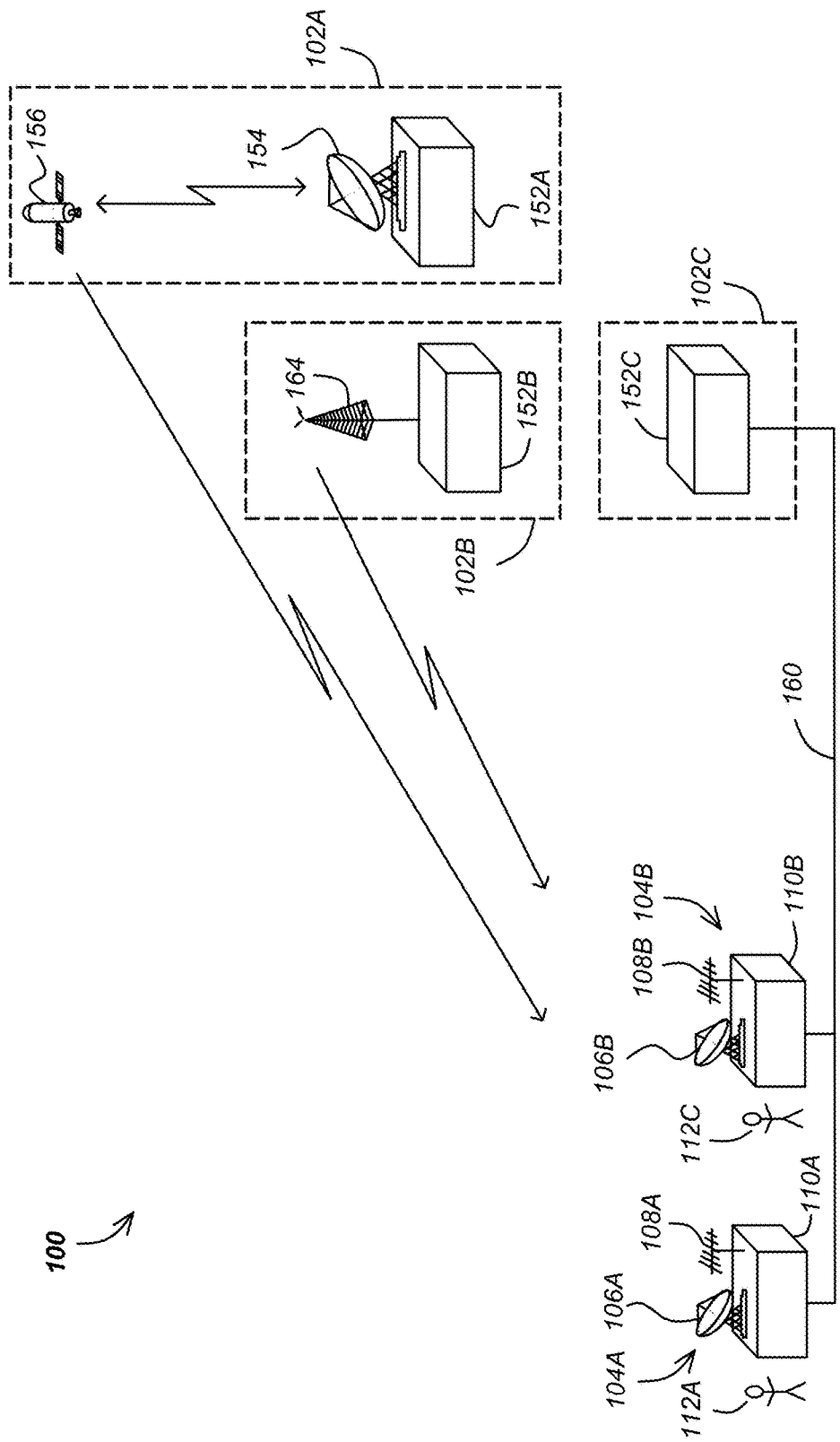
FIG. 1 is a diagram illustrating a media program distribution system.

FIG. 1 is a diagram illustrating a media program distribution system 100. The system 100 includes a plurality of service providers (hereinafter alternatively referred to as broadcasters) 102, including a first service provider 102A that broadcasts media programs from a satellite broadcast facility 152A via one or more uplink antennas and one or more satellites 156, a second service provider 102B, that broadcasts media programs from terrestrial broadcast facility 152B and one or more terrestrial antennas 164, and a third service provider 102C that broadcasts media programs via a cable link 160.

The system 100 also comprises a plurality of subscriber stations 104A, 104B (alternatively referred to hereinafter as subscriber station 104), each providing service to one or more subscribers 112A, 112B (alternatively referred to hereinafter as subscribers 112). Each subscriber station 104A, 104B may include a satellite reception antenna 106A, 106B (alternatively referred to hereinafter as satellite reception antenna 106) and/or a terrestrial broadcast antenna 108A, 108B (alternatively referred to hereinafter as terrestrial broadcast antenna 108) communicatively coupled to a receiver 110A, 110B (alternatively referred to hereinafter as receiver 110), which is also known as a set top box (STB) or an integrated receiver/decoder (IRD).

As described above, in prior art systems, each receiver 110A, 110B (or at least, each conditional access system used with each receiver) is capable of receiving subscriber-based media programs from only one of the media program providers 102. Hence, if a subscriber 112 wanted to receive media programs from more than one media program provider 102 on a subscription basis, the subscriber may need not only to have a multiple receivers 110 at the subscriber station 104A, but also, will require multiple conditional access systems.

Figure 2:
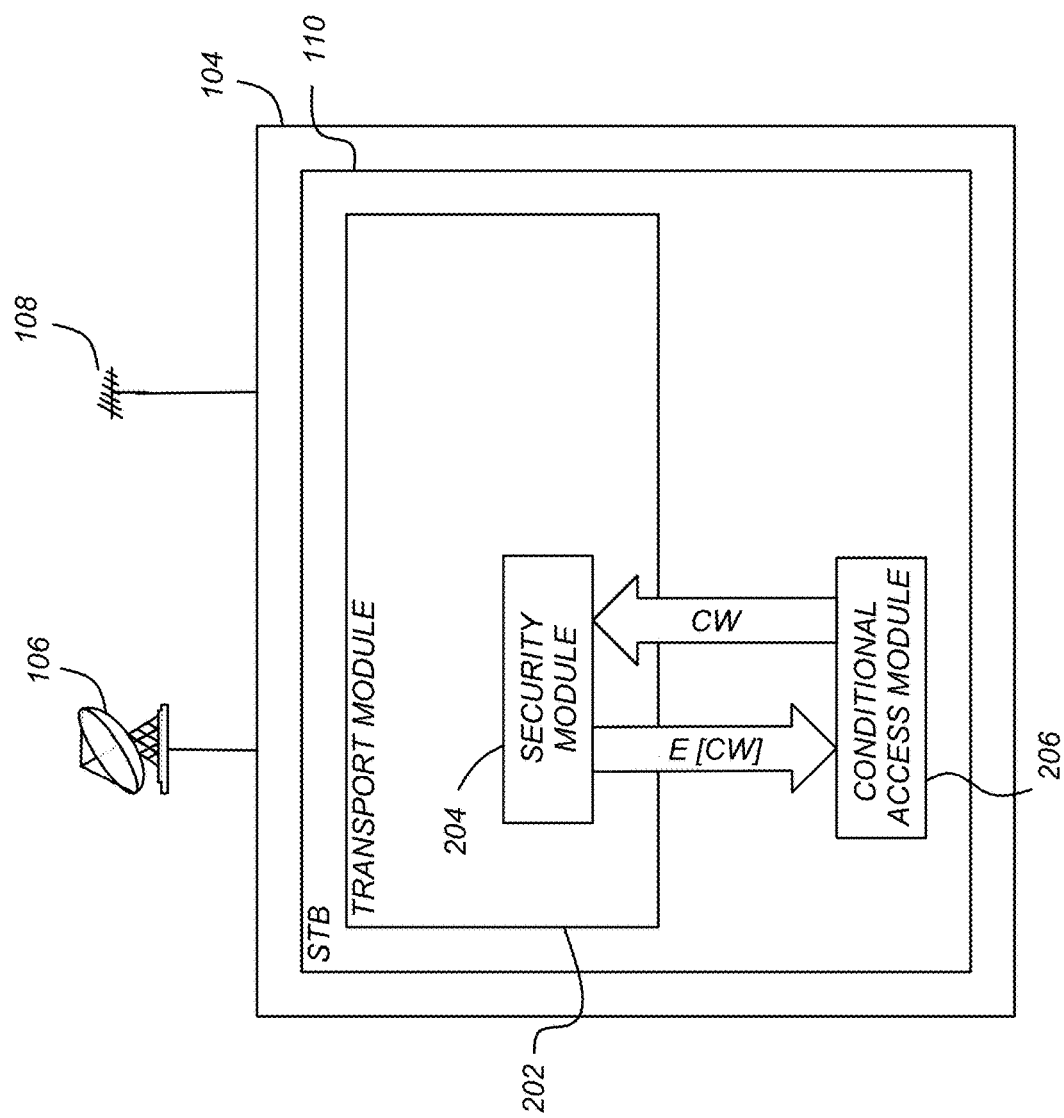
FIG. 2 is a diagram of a typical subscriber station.

FIG. 2 is a diagram of a typical subscriber station 104. Each station 104 includes at least one receiver or STB 110, which itself includes a transport module 202 that communicates with a conditional access module (CAM) 206. In one embodiment, the CAM 206 is a smart card that is removably communicatively coupleable to the transport module 202 and hence, the STB 110. In another embodiment, the CAM 206 is a device such as a chip or a collection of devices that are physically integrated with the STB 110 and irremovable. To assure that only those who subscribe to the service are provided with media programs, the service providers typically encrypt the media program M with a control word CW, thus producing and encrypted program $E_{CW}[M]$, and transmit the encrypted media program $E_{CW}[M]$ and an encrypted version of the control word E[CW] to the receiver 110. The receiver 110 receives both the encrypted program $E_{CW}[M]$ and the encrypted control word E[CW]. The transport module 202 analyzes the incoming data stream and passes the encrypted control E[CW] to the CAM 206, which decrypts the control word CW and returns the decrypted control word CW to a security module 204 or similar device in the transport module 202. The security module 204 then uses the control word CW to decrypt the encrypted media program $E_{CW}[M]$ to produce the media program M for presentation to the subscriber. This system assures that only those who are in possession of a valid CAM 206 can receive and decode media programs. However, it does not prevent the use of the CAM 206 in any other STB 110. Hence, if the CAM 206 is compromised or duplicated, unauthorized access to media programs is possible.

Figure 3:
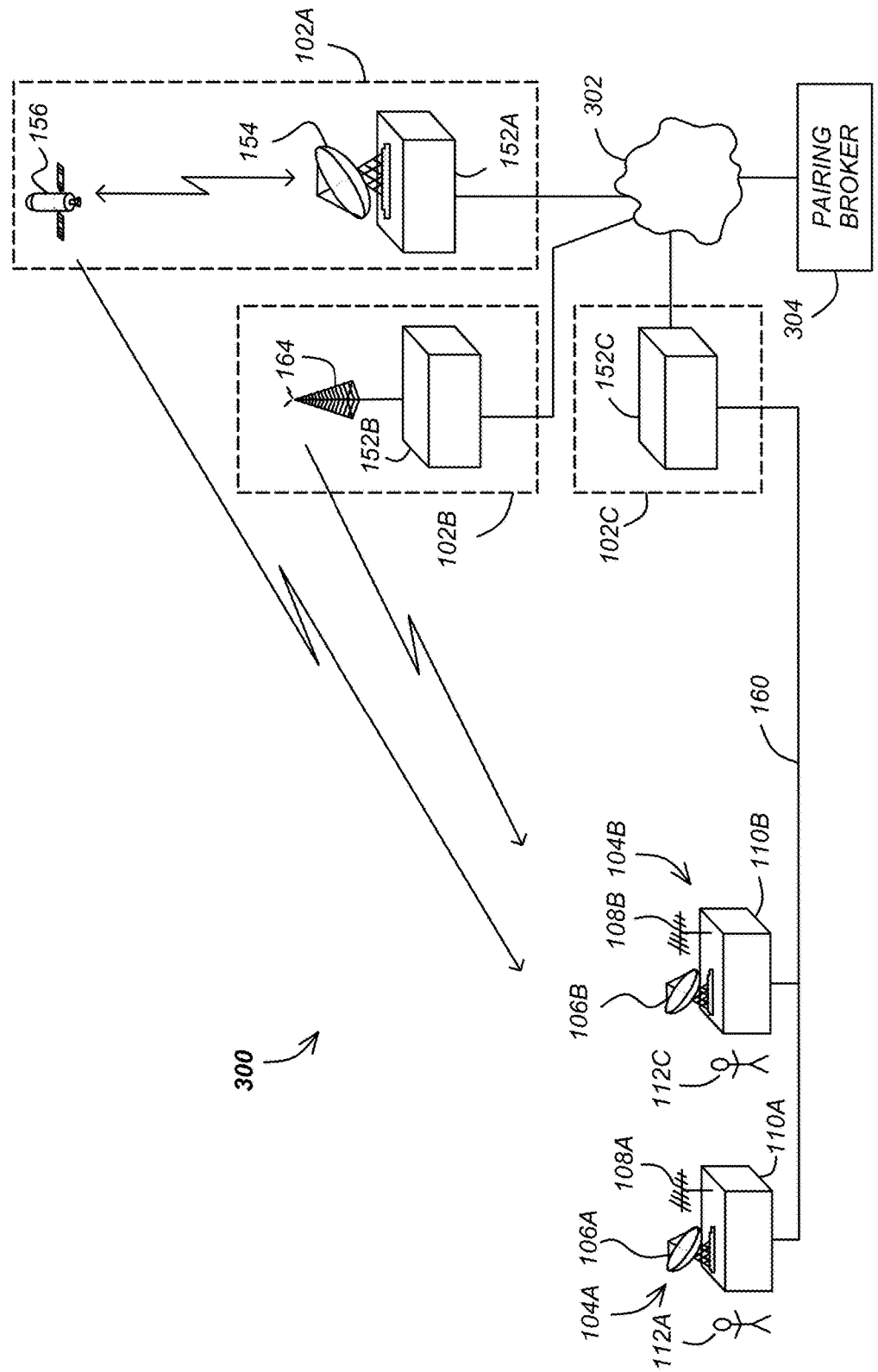
FIG. 3 is a diagram illustrating a multiple broadcaster media program distribution system.

FIG. 3 is a diagram illustrating a multiple broadcaster Conditional Access Subscriber Administration System (CA-SAS) 200. The CASAS 200 is similar to that which is disclosed in FIG. 1, but includes a pairing broker 304, which can communicate with the broadcast facilities 152 via a communications medium 302 such as the Internet.

FIGS. 4A-4D are diagrams illustrating one embodiment of how the pairing broker 304 cooperatively operates with multiple service providers 102 and equipment at the subscriber stations 104 to implement a conditional access system. FIGS. 4A-4D will be described in connection with and with reference to FIGS. 5 and 6, which illustrate one embodiment of the service provider 102 elements and STB 110 elements, respectively.

Figure 4A:
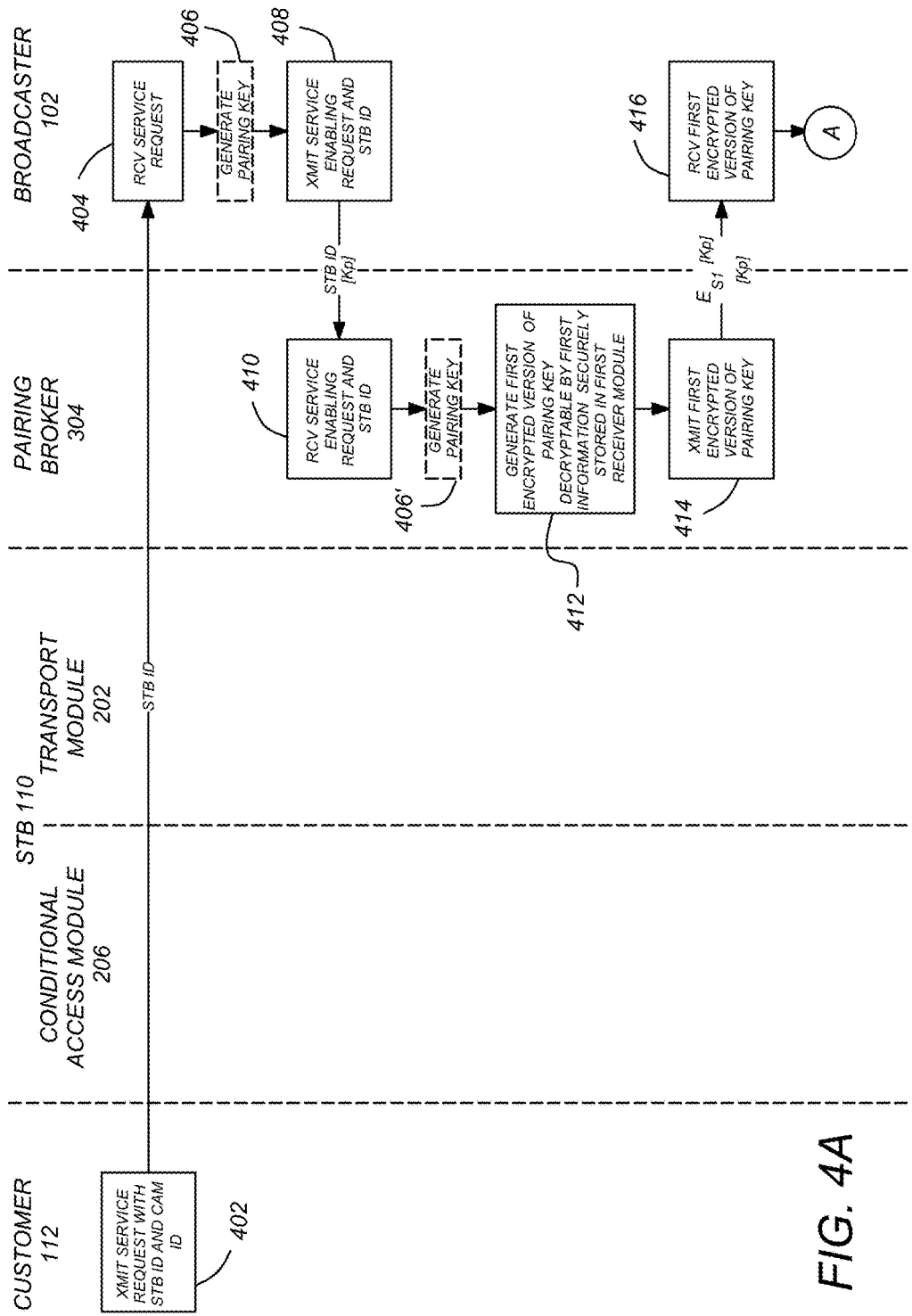
FIGS. 4A-4D are diagrams illustrating one embodiment of how the pairing system cooperatively operates with multiple service providers and equipment at the subscriber stations to implement a conditional access system.
Figure 4B:
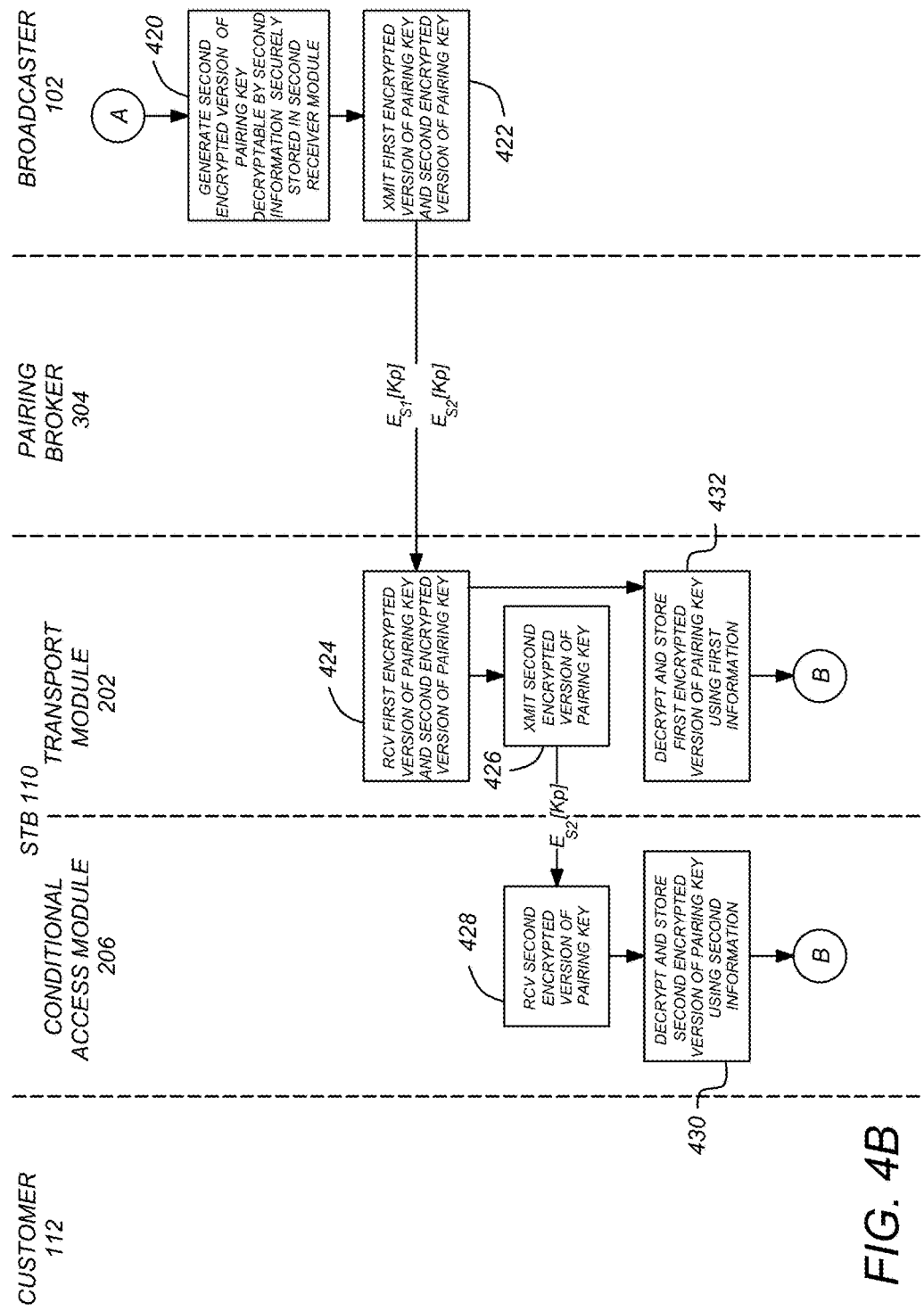

FIG. 4A begins with a potential customer 112 who has decided to subscribe a media program service offered by a service provider 102. To do so, the subscriber contacts the service provider 102 and transmits information sufficient to identify the STB and the CAM to the service provider 102, as shown in block 402. In one embodiment, this information includes an STB 110 unique identifier (ID) (such as a serial number or other designation) and a CAM 206 unique identifier (CAM ID). In a preferred embodiment, this is accomplished by transmitting the information via the Internet 302 or similar network.

This can be accomplished by use of a web browser implemented in a computer 512 disposed at the subscriber station 104 and a web transaction module 502 implemented at the service provider 102. If desired, the subscriber's web browser can include the appropriate references to the URL where the request and STB ID and CAM ID should be transmitted. In one embodiment, in addition to the STB ID, the potential subscriber also transmits his/her credit card information (e.g. the account number) as well. This allows for services to be automatically billed for monthly subscription fees without further interaction. Credit card payment administration can be performed by the service provider 102 or by a third party such as PAYPAL. These functions can be performed by the subscriber administration module (SAM) 504. The SAM 504 can also comprise or be integrated with a customer relationship management (CRM) system or systems. If access is approved (e.g. if the supplied credit card information has been verified), the subscriber administration module 504 directs the web transaction module 502 to request a pairing key $K_p$ from the pairing broker 304.

This implementation reduces the support requirements for the service provider 102. In other embodiments, the potential customer 112 can contact the service provider 102 via telephone or other means and provide the service request, STB ID, and CAM ID. Further, if desired, the pairing broker 304 can receive the service request (preferably via an appropriate Internet interface) and forward the request for service and the appropriate identifying information to the service provider 102.

The service provider 102 receives the service request the identifying information, as shown in block 404. The service provider 102 then transmits an enabling service request and the STB ID to the pairing broker 304, as shown in block 408. In block 410, the pairing broker 304 receives the service enabling request and the STB ID. A first encrypted version of a pairing key $K_p$ is then provided. The pairing key $K_p$ was generated either in block by the service provider 102, as shown in block 406 or, preferably by the pairing broker 304, as shown in block 406'. The first encrypted version of the pairing key $K_p$ is provided so as to be decryptable using first information $S_1$ securely stored in a first receiver module such as the transport module 202 shown in FIG. 6 (the first encrypted version of the pairing key $K_p$ therefore described as $E_{S_1}[K_p]$). In one embodiment, this is accomplished by use of a secret that is known to the pairing broker 304, but unknown to the service provider 102. The STB IDs and related first information $S_1$ can be stored in a table or a database 514 in the pairing broker 304. If desired, the related first encrypted versions of the pairing key $E_{S_1}[K_p]$ can be stored as well.

In block 414, the first encrypted version of the pairing key $E_{S_1}[K_p]$ is transmitted to the service provider 102. If the pairing key $K_p$ was generated by the pairing broker 304, the pairing key $K_p$ is also transmitted to the service provider 102. One of both of the first encrypted version of the pairing key $E_{S_1}[K_p]$ and the pairing key $K_p$ can be securely transmitted to the service provider 102 via a shared secret, a private key, or a public/private key security paradigm, if desired.

The foregoing process can be used to request all services from a service provider with a single pairing key $K_p$ or repeated to request other services from the service provider 102, with each service enabled and controlled via a different pairing key $K_p$. For example, the service provider 102 may provide both general services (e.g. access to a number of channels as a part of a baseline fee service) and pay-per-view services (e.g. access to a particular program or set of programs on a pay-per-view basis). Therefore, if the foregoing process was undertaken to subscribe to the general services and the potential subscriber 112 desires order ahead pay per view (OPPV) services or impulse pay per view (IPPV) services as well, the foregoing process can be repeated for those services, resulting in the provision of a first encrypted version of a different pairing key for each service. The system 200 has the ability to store credit information in the security module 204, CAM 206, or elsewhere, and can therefore limit the amount of IPPV events the subscriber can purchase prior to requesting additional credits. Finally, the potential subscriber 112 can repeat this process for each service provider 102 from which they wish to receive service.

Although the pairing broker 304 need not generate or store the pairing keys $K_p$, it may be desirable to do so. FIG. 5B is a diagram showing a table that might be used to store and relate the STB ID to first information $S_1$, a service provider 102 identifier (BDCST ID), and pairing keys for general services, IPPV, and multiple OPPV services.

In block 420, the service provider 102 receives the first encrypted version of the pairing key $K_p$, and generates a second encrypted version of the pairing key $K_p$ such that it is decryptable by second information $S_2$ securely stored in a second receiver module such as the conditional access module 206 (the second encrypted version of the pairing key $K_p$ therefore described as $E_{S_2}[K_p]$).

The service provider 102 can store a table or database relating STB IDs and the pairing keys $K_p$ for each of the provided services. FIG. 5C is an example of how such information may be stored. Note that the BRDCST ID column is not necessary in this case, because the identity of the service provider 102 is inherently known.

Figure 6:
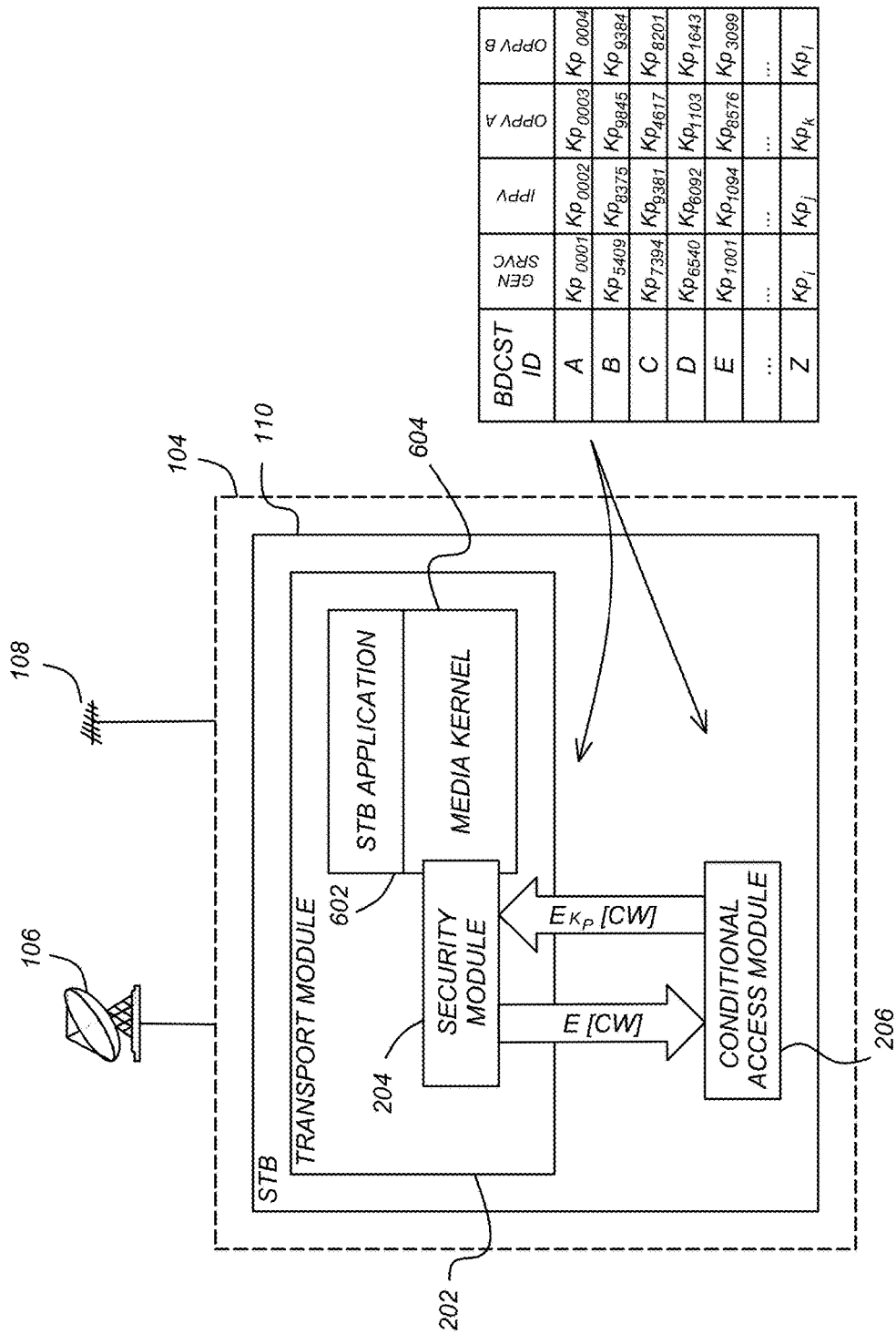
FIG. 6 is a diagram illustrating one embodiment of the STB.

In block 422, the service provider 102 transmits an entitlement control message (ECM) or an entitlement management message (EMM) to the subscriber station. The ECM is transmitted to the STB 110 in response to a subscriber request for access to general media programs from the service provider 102, while the EMM is transmitted in response to a subscriber request for a specific program (e.g. an impulse or order ahead pay-per-view). The ECM/EMM includes the first encrypted version of the applicable pairing key $E_{S_1}[K_p]$, the second encrypted version of the pairing key $E_{S_2}[K_p]$, and the ID of the service provider 102 (BRDCST ID) which is providing the services related to the pairing key $K_p$. This transmission can be accomplished via the same system used to transmit the media program M itself, or a different communication system such as the Internet or a public switched telephone network (PSTN) or cellphone network. In block 424, the transport module 202 receives the first encrypted version of the pairing key $E_{S_1}[K_p]$ and the second encrypted version of the pairing key $E_{S_2}[K_p]$, and the service provider ID. The second encrypted version of the pairing key $E_{S_2}[K_p]$ is provided to the conditional access module 310, where it is received, decrypted (using the second information $S_2$) to obtain the pairing key $K_p$ which is stored (along with a reference to the service provider ID (BRDCST ID) from which the pairing key $K_p$ was received), as shown in blocks 428 and 430. Similarly, the first encrypted version of the pairing key $E_{S_1}[K_p]$ is decrypted and stored in the transport module 202 (also along with a reference to the service provider ID from which the pairing key $K_p$ was received), as shown in block 432. FIG. 6 shows an exemplary embodiment of how the data relating services, broadcasters, and pairing keys $K_p$ might be stored in the transport module and the conditional access module.

Thereafter, the pairing key $K_p$ is used to encrypt communications between the conditional access module 206 and the transport module 202. Henceforward, the conditional access module 206 cannot be used a different STB 110, although if desired, more than one STB 110 can be provided to a customer, each having the same first information the conditional access module to be used with different STBs 110 in the same household.

To begin service, the broadcast module 506 and/or the broadcast headend 516 encrypts media programs M 510 according to a control word (CW), encrypts the control word (CW) itself, and broadcasts a program stream comprising the encrypted program material $E_{CW}[M]$ and the encrypted control word E[CW] to the STBs 104, as shown in blocks 450, 452 and 454. The program stream may also comprise program guide information from the program guide module 508.

The transport module 202 in the STB 110 receives the program stream, separates out the packets of information by channel (typically according to a packet ID), and provides the encrypted control word E[CW] to the conditional access module 206. The conditional access module 206 receives the encrypted control word E[CW] decrypts it to recover the control word (CW), encrypts the control word (OF) with the pairing key $K_p$, and provides the encrypted pairing key $E_{K_p}[CW]$ to the transport module 202, as shown in blocks 460-466. Using an STB application 602 and media kernel 604, the transport module 202 decrypts the encrypted control word $E_{K_p}[CW]$ using the pairing key $K_p$ thus recovering the control word (CW), as shown in block 472, and uses the decrypted control word (CW) to decrypt the encrypted media program $E_{CW}[M]$ to produce the media program M, as shown in block 474.

The foregoing system can be used to modify or change the provision of services from the service provider 102 as well. This can be accomplished by the service provider 102 deleting, adding, or modifying the pairing keys $K_p$ in cooperation with the pairing broker 304 in essentially the same way as described above. Such modification can occur at the subscriber's behest (e.g. the subscriber desires either more, less, or different services than previously), or that of the service provider 102 (e.g. if the offered services change or the subscriber's credit card is no longer valid).

The modules described above can be implemented as one or more software modules comprising instructions being performed by one or more special or general purpose processors, or may be implemented with hardware modules having dedicated circuitry, or with both hardware and software modules. In one embodiment, for example, the pairing broker 304 is implemented by a pairing server, and the program guide module 508, broadcast module 506, subscriber administration module 504 and web transaction module 502 are all implemented as servers, the transport module 202 and security module 204 are implemented in a secure, tamperproof electronic circuit, and the conditional access module is implemented on a smart card.

Derived Key Mechanism in SoCs

The system and method described above uses unique secrets $S_1$ and $S_2$ into the transport module 202 and CAM 206. In the embodiments described below, either or both of the unique secrets $S_1$ and $S_2$ can be derived from a hardware root of trust that is programmed into the device itself. For example, the transport module 202 or CAM may be at least partially implemented using System-on-Chip (SoC) architectures that permit hardware root of trust values to be programmed into the SoC at the SoC manufacturing site using black-box techniques. Since the values of $S_1$ and $S_2$ are computed from the hardware root of trust using software and key values that may be provided by the security provider, this permits later allocation of these SoCs to any one of a number of potential CE device manufacturers and many independent CAS/DRM security providers (security provider in this context broadly refers to any entity that would use the derived key database for a population of fielded CE devices to protect content for purchase by another entity who had a particular CE device in the deployed location (e.g. home). SoC programming can also occur at the packaging or product manufacturing facility by execution of an in-field programming sequence on the SoC.

In traditional broadcast and cable system, content is offered to subscribers within the content distribution ecosystem directly from the service provider, i.e. satellite or cable provider. In some embodiments of such systems, security based on a hardware root of trust is used for high value content. In both CAS and DRM content distribution paradigms, a security provider independent architecture can support multiple concurrent or serial CAS and DRM implementations using a single black box programming security platform with limited One Time Programming (OTP) resources to store secrets representing the hardware root of trust that are used to derive the $S_1$ and $S_2$ values. This "derived key" security architecture implementation can provide a means for instantaneous switching between security profiles offered by different and independent CAS and DRM security providers.

Hence, security providers may use black box OTP resources as the basis to derive security keys to enable different security schemes by altering the key generation inputs based on CAS and DRM vendor software and possibly vendor unique OTP inputs. The key generation inputs can be provided in the CAS and DRM application that could be loaded at CE device manufacturing or downloaded over the air for a fielded CE device.

Key derivation can be accomplished in a number of ways, for example, by taking the black box programmed secret OTP keys, CAS/DRM vendor (security provider) software input and possible CAS/DRM vendor unique OTP values and combining in a series of crypto graphic calculations using AES, DES or Triple DES. Where the black box programmed secret OTP keys are used as the key and the software input and CAS/DRM vendor unique OTP values are the data in the crypto graphic operation.

By changing the key generation inputs used to compute $S_1$ and $S_2$ values, the SoC can derive unique key outputs for each CAS and DRM security provider used for a given content provider or broadcaster. CAS unique inputs such as their assigned conditional access identifier (CA ID) maybe used to differentiate derived keys for different conditional access systems CAS1 versus CAS2.

These security provider unique key generation outputs enable support for multiple security providers for fielded CE devices typically found in STBs 110, televisions (TVs), Smart TVs and mobile devices such as smartphones. The black box security provider provides compatible headend applications to each content provider, so that the media programs are encrypted or otherwise protected using the CAS and DRM implementation used.

Another advantage of using a derived key database is that the black box programmed OTP key secrets programmed into the SoC OTP do not have to be divulged to the multiple CAS and DRM security providers, since these security providers would use the derived key databases for their content protection systems, not the OTP value. This means that if a derived key database were compromised, it only affects the specific CAS/DRM security provider that was using that specific derived key database, i.e. such compromise would not affect the fielded CE devices or derived key databases of any other such CAS/DRM security provider.

The keys and programming infrastructure provided by an independent black box security provider enables fielded CE devices to add additional revenue baring applications to the CE device manufacturer or content provider giving these entities more flexibility in managing their business and offering new services. Besides switching out a CAS/DRM vendor for any number of reasons, enabling the ability to add applications supporting new CAS/DRM vendors in fielded CE devices can result in generating significantly higher content sale revenues without requiring consumers to upgrade their CE devices. Consumer savings are realized by extending the field life of the CE device by allowing the consumer to download new software images to enable the purchase of new content services without having to replace their fielded CE devices.

Figure 4C:
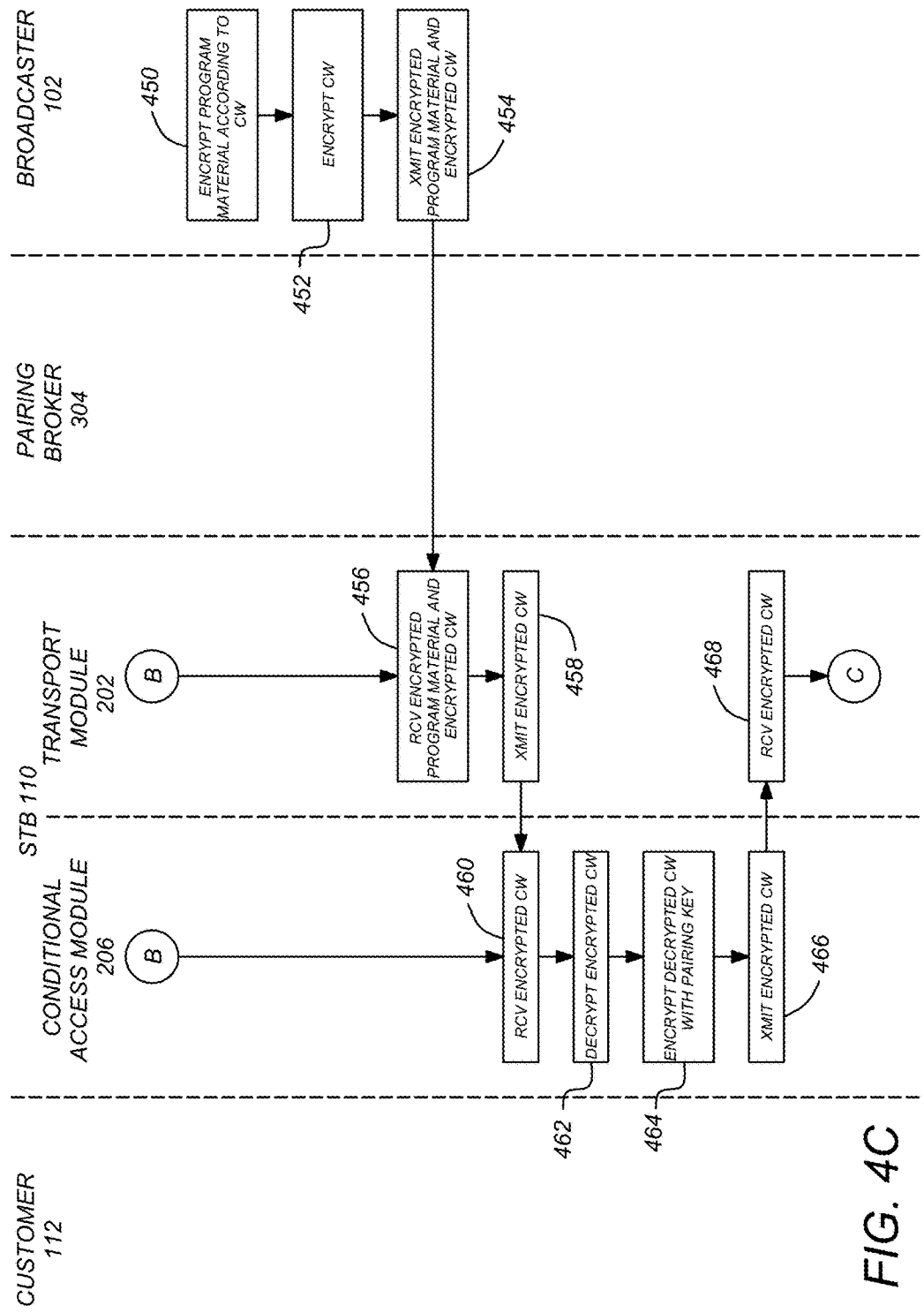
Figure 4D:
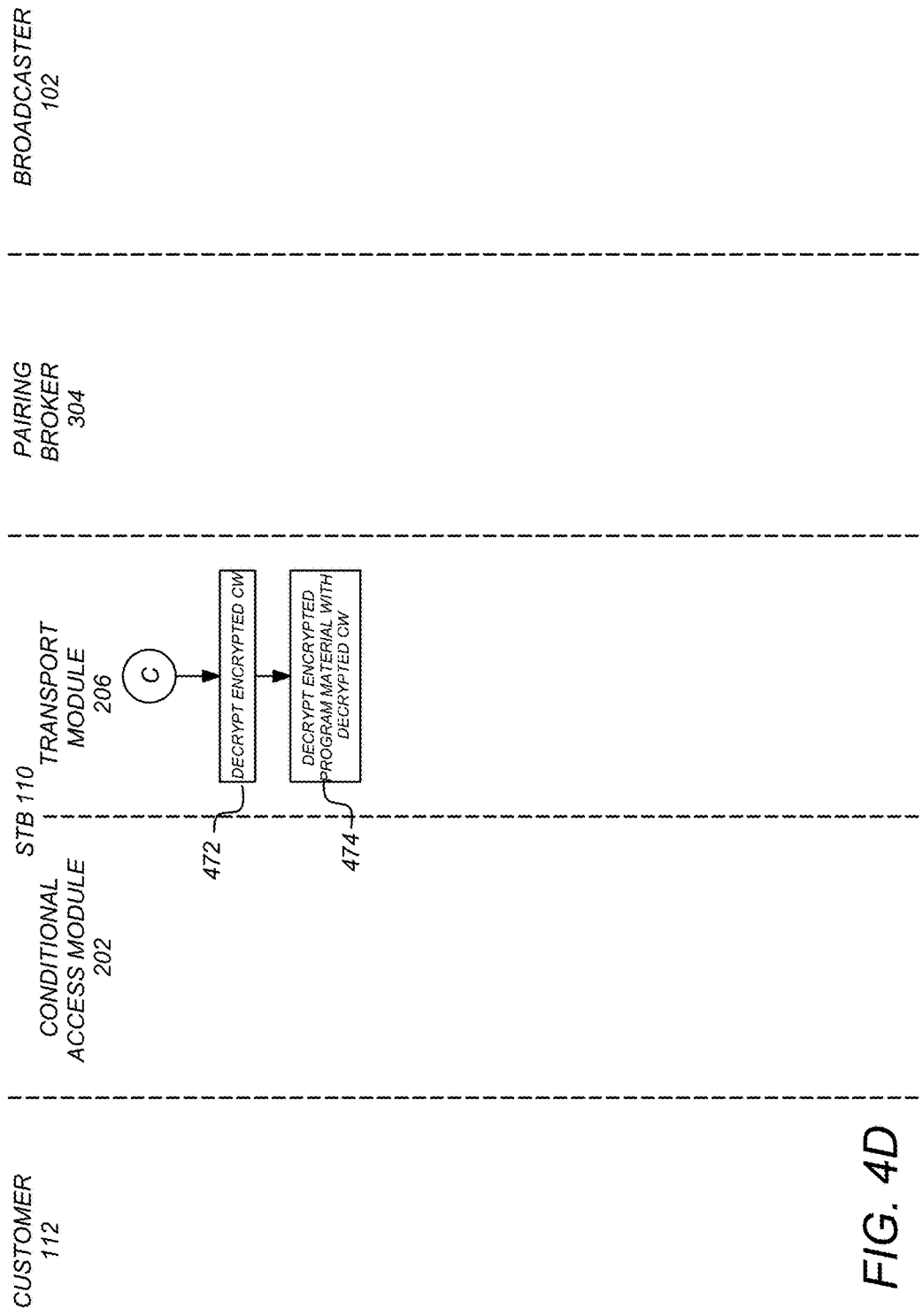
Figure 5A:
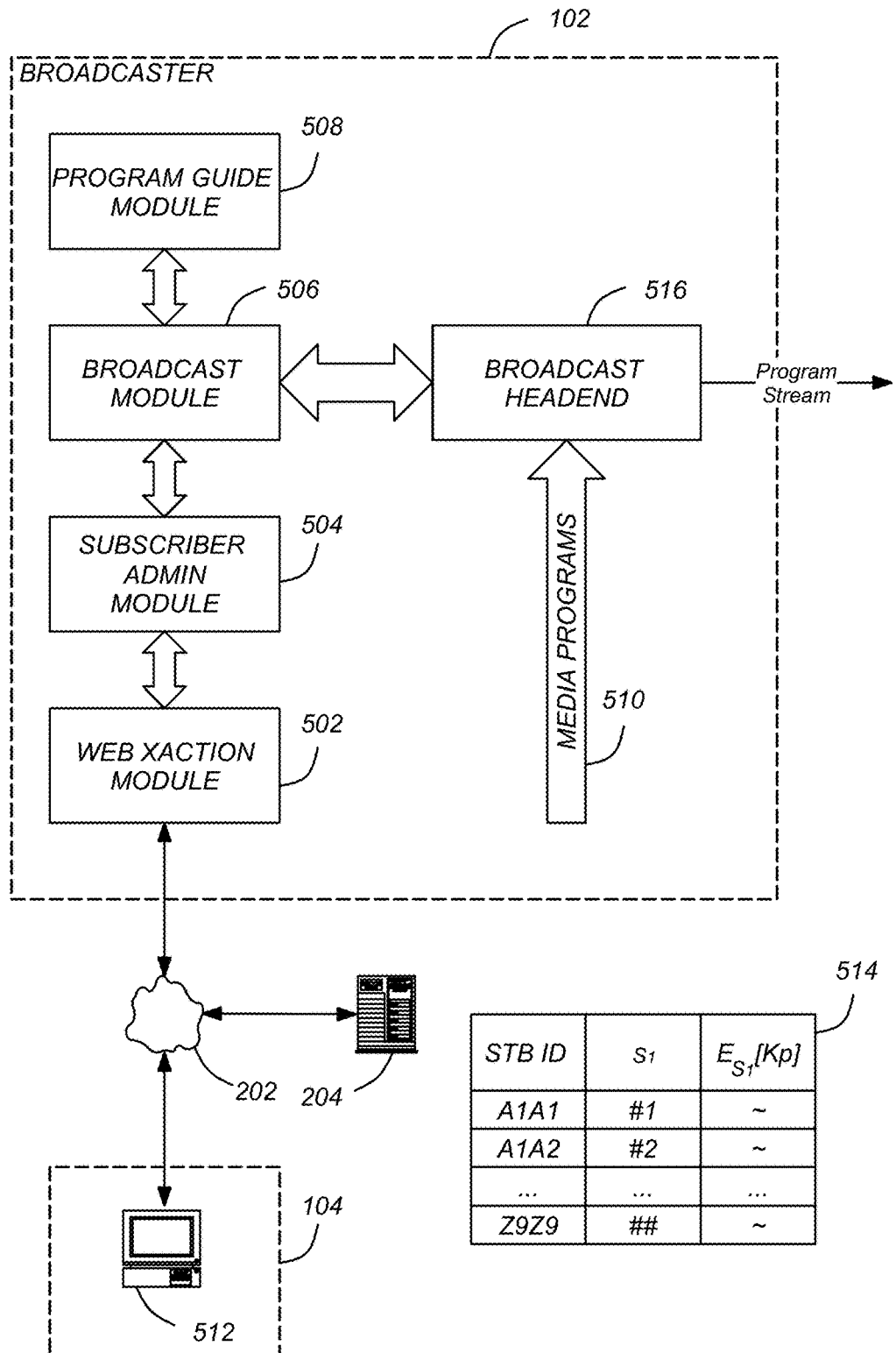
FIG. 5A is a diagram illustrating one embodiment of the service provider.

Extending Fixed Secrets with Key Derivation Key derivation techniques can be used to extend the fixed secret, $S_1$, shown in FIGS. 5A and 5B to decrypt either of the encrypted paring keys $E_{S_1}[K_p]$, $E_{S_2}[K_p]$ to with secrets $S_1$ and $S_2$, respectively produce the pairing key $K_p$ that is used to decrypt the ECW shown in FIG. 4C. The extension provides the ability to: (1) Use derived root keys to produce $S_1$ and alternately or in addition, using such root keys to produce $S_2$ and (2) Use this derivation process as a means of renewing key material for a fielded system.

For example, in a System-on-Chip architecture such as the architecture described in the above-referenced patent application U.S. patent application Ser. No. 15/207,332, now published as U.S. Patent Publication No. 2017/0012952, hardware root of trust values can provide the basis for security providers such as the pairing broker 304 and/or one or more of the broadcasters 102 to derive a plurality of different security keys. Such keys can be used to add new security procedures or modify procedures already implemented. This can be accomplished, for example, by altering the key generation inputs based on security provider software (CAS or DRM) and possibly inputs vendor-unique hardware root of trust values. The key generation inputs can be provided in the CAS and DRM application software that could be loaded at into consumer electronics (CE) devices such as the transport module 2002 or CAM 206 when the devices are manufacture, or remotely downloaded over the air for a fielded CE device. This permits cryptographic separation of the CE devices at both $S_1$ and $S_2$.

Such hardware root of trust values can include one-time-programmable (OTP) values programmed into the transport module 202 and or CAM 206 using, for example, black box techniques also described in U.S. Patent Publication No. 2017/0012952. Such OTP values may be held secret from other entities as necessary. For example, the pairing broker 304 or third party security provider may provide a black box to the broadcaster 102 or manufacturer of the STB, permitting the storage of an OTP value without disclosing that value to the security provider or broadcaster.

Another advantage of using a derived key database is that the black box programmed OTP key secrets programmed into the SoC OTP may be held secret from (do not have to be released to) the CAS or DRM security provider, since these security providers would use the OTP key secrets to derive the keys required for their content protection system. This permits supporting multiple security provider vendors. Further, if a database of derived keys database were compromised, this compromise only affects the specific CAS/DRM security provider that was using that specific derived key database, and would not affect the fielded CE devices or derived key databases of any other such CAS/DRM security provider. This allows $S_1$ (and/or $S_2$) to be updated in the event of an attack that compromises the database of keys.

Figure 7:
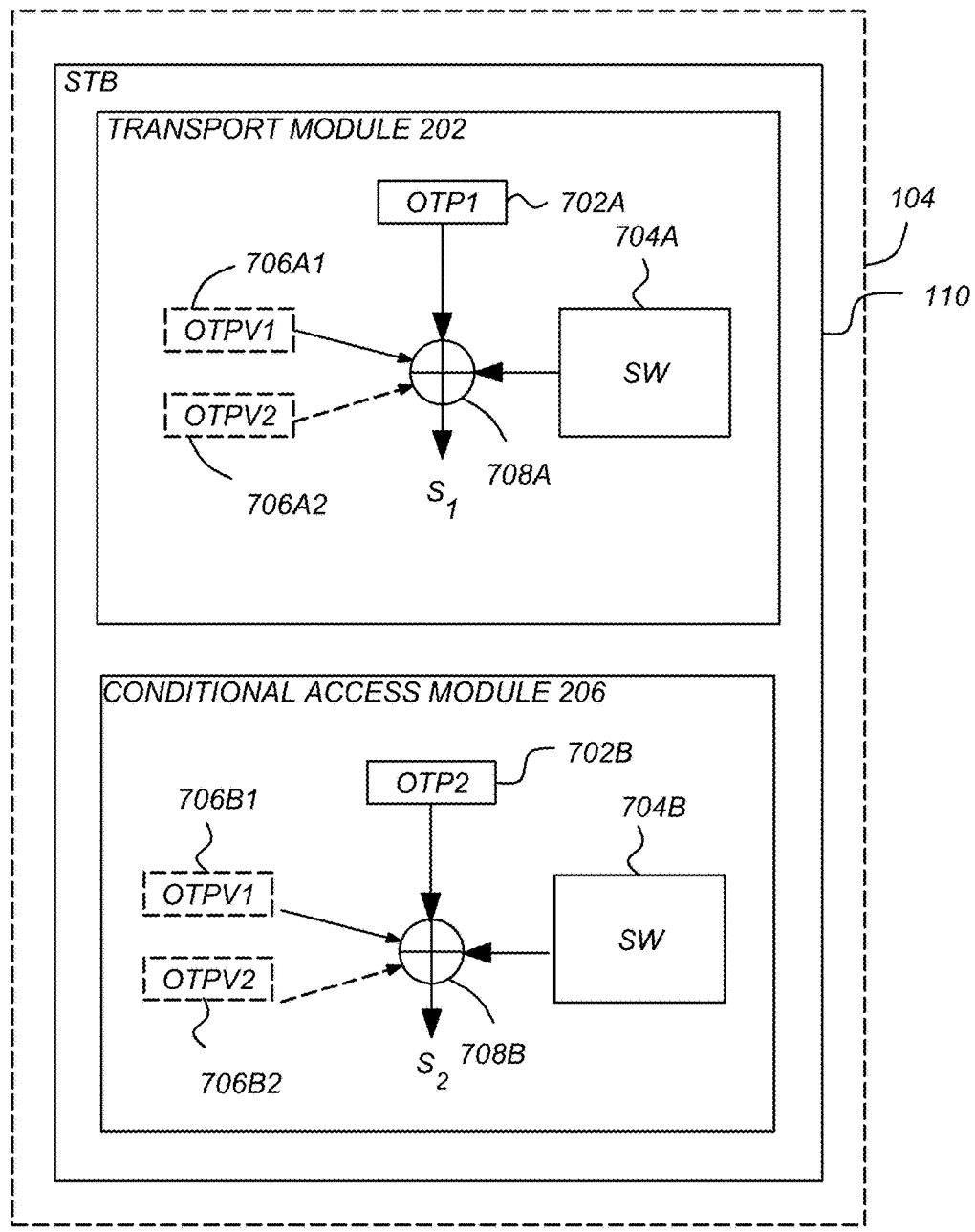
FIG. 7 is a diagram illustrating an exemplary embodiment of the transport module and the CAM.

FIG. 7 is a diagram illustrating an exemplary embodiment of the transport module 202 and the CAM 206, wherein the transport module 202 includes a hardware root of trust value OTP1 702A and/or the CAM 206 has another hardware root of trust value OTP2 702B, thus permitting at least one of the first information $S_1$ and second information $S_2$ to be derived from a hardware root of trust secret stored in at least one of the transport module 202 and the CAM 206.

In the illustrated embodiment, the transport module 202 has a SoC with a processor that can perform processor instructions 704A. The processor has access to OTP 1 702 and can use deriving information such as the processor instructions 704A to derive or generate the first value $S_1$ via one or more operations 708A. Similarly, the CAM 206 comprises a SoC with a processor that can perform processor instructions 704B. The processor has access to OTP 1 702 and can use the processor instructions 704A to generate the first value $S_1$ via one or more operations 708B.

The transport module 202 may also store one or more further hardware root of trust values OTP1 706A1 and OTP2 706A2 that can also be used as deriving information to generate the first value $S_1$. In one embodiment, OTP1 706A1 and OTP2 706A2 are security provider-unique, with each allocated to different security providers, allowing the transport module 202 to support CAS/DRM procedures of multiple security providers, allowing each such security provider to use their own OTP value 706A to generate first information $S_1$. However, security providers may be provided multiple OTP values as well.

Likewise, the CAM 206 may also store one or more further hardware root of trust values OTP1 706B1 and OTP2 706B2 that can also be used to generate the second value $S_2$. OTP1 706B1 and OTP2 706B2 may be allocated to the same security provider, or different security providers, allowing the CAM 206 to support CAS/DRM procedures of multiple security providers.

Hardware Environment

Figure 8:
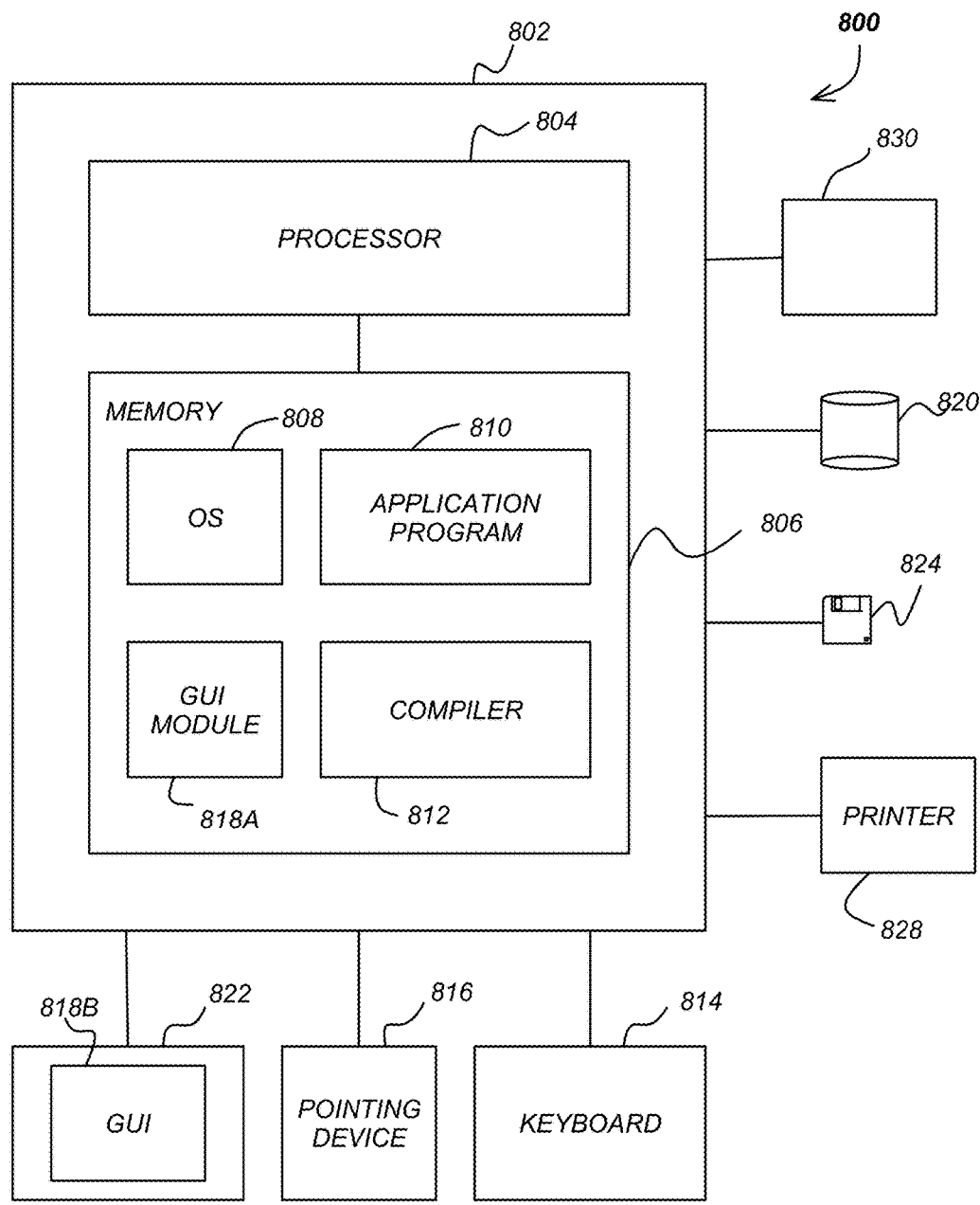
FIG. 8 is a diagram of a computer that can be used to implement selected modules.

FIG. 8 illustrates an exemplary computer system 800 that could be used to implement the servers or the subscriber computer 512 of the present invention. The computer 802 comprises a processor 804 and a memory, such as random access memory (RAM) 806. The computer 802 is operatively coupled to a display 822, which presents images such as windows to the user on a graphical user interface 818B. The computer system 802 may be coupled to other devices, such as a keyboard 814, a mouse device 816, a printer, etc. Of course, those skilled in the art will recognize that any combination of the above components, or any number of different components, peripherals, and other devices, may be used with the computer 802.

Generally, the computer 802 operates under control of an operating system 808 stored in the memory 806, and interfaces with the user to accept inputs and commands and to present results through a graphical user interface (GUI) module 818A. Although the GUI module 818A is depicted as a separate module, the instructions performing the GUI functions can be resident or distributed in the operating system 808, the computer program 810, or implemented with special purpose memory and processors. The computer 802 also implements a compiler 812 which allows an application program 810 written in a programming language such as COBOL, C++, FORTRAN, or other language to be translated into processor 804 readable code. After completion, the application 810 accesses and manipulates data stored in the memory 806 of the computer 802 using the relationships and logic that was generated using the compiler 812. The computer 802 also optionally comprises an external communication device such as a modem, satellite link, Ethernet card, or other device for communicating with other computers.

In one embodiment, instructions implementing the operating system 808, the computer program 810, and the compiler 812 are tangibly embodied in a computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of instructions which, when read and executed by the computer 802, causes the computer 802 to perform the steps necessary to implement and/or use the present invention. Computer program 810 and/or operating instructions may also be tangibly embodied in memory 806 and/or data communications devices 830, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of brokering an enabling of communication of encrypted media programs from a plurality of broadcasters to a plurality of receivers, each encrypted media program decryptable by a first receiver module securely communicating with a second receiver module according to a pairing key associated with one of the plurality of receivers, comprising the steps of:

transmitting a first service enabling request from one of the plurality of broadcasters to a broker independent from the one of the plurality of broadcasters, the request comprising an identification of the one of the plurality of receivers;

receiving a first encrypted version of the pairing key $E_{S_1}[K_p]$ from the broker, the first encrypted version of the pairing key $E_{S_1}[K_p]$ decryptable by first information $S_1$ securely stored in the first receiver module of the one of the plurality of receivers;

encrypting the pairing key with second information $S_2$ to generate a second encrypted version of the pairing key $K_p$, the second encrypted version of the pairing key $E_{S_2}[K_p]$ decryptable by the second information $S_2$ securely stored in the second receiver module; and transmitting the first encrypted version of the pairing key $E_{S_1}[K_p]$ and the second encrypted version of the pairing key $E_{S_2}[K_p]$ to the one of the plurality of receivers;

wherein at least one of the first information $S_1$ and the second information $S_2$ is derived from a hardware root of trust stored in at least one of the first receiver module and the second receiver module.

2. The method of claim 1, wherein the hardware root of trust is a secret one-time programmably stored in at least one of the first receiver module and the second receiver module.

3. The method of claim 1, wherein:

the first information $S_1$ is derived from a first secret one time programmably stored in the first receiver module and first deriving information.

4. The method of claim 3, wherein:

the first deriving information comprises a plurality of instructions stored in the first receiver module.

5. The method of claim 4, wherein:

the first deriving information further comprises a key.

6. The method of claim 5, wherein:

the key is a security provider-unique one time programmable value known only to the security provider.

7. The method of claim 3, wherein the first deriving information is remotely downloaded to the first receiver module.

8. The method of claim 1, wherein at least one of the encrypted media programs is encrypted according to an encrypted control word E[CW], and the method further comprising the steps of:
  decrypting the first encrypted version of the pairing key $E_{S_1}[K_p]$ in the first receiver module;
  decrypting the second encrypted version of the pairing key $E_{S_2}[K_p]$ in the second receiver module;
  decrypting the encrypted control word E[CW] in the second receiver module;
  re-encrypting the decrypted control word CW according to the decrypted second encrypted version of the pairing key;
  providing the re-encrypted control word $E_{K_p}[CW]$ from the second receiver module to the first receiver module; and
  decrypting the re-encrypted control word $E_{K_p}[CW]$ using the decrypted first encrypted version of the pairing key $K_p$.

9. The method of claim 1, wherein the first service enabling request is for one service from the one of the plurality of broadcasters.

10. The method of claim 1, wherein the first service enabling request is for a plurality of services from the one of the plurality of broadcasters.

11. A system for brokering an enabling of communication of encrypted media programs from a plurality of independent broadcasters to a plurality of receivers, each encrypted media program decryptable by a first receiver module securely communicating with a second receiver module according to a pairing key $K_p$ associated with one of the plurality of receivers, the system comprising:
  a broker, having a server processor and a memory, the memory comprising broker processor instructions including instructions for providing a first encrypted version of the pairing key $E_{S_2}[K_p]$ in response to a service enabling request from one of the plurality of broadcasters, the service enabling request having an identification of one of the plurality of receivers; and
  wherein:
    the first encrypted version of the pairing key $E_{S_1}[K_p]$ is decryptable by first information $S_1$ stored in the first receiver module; and
    the first information $S_1$ is derived from a hardware root of trust stored in at least one of the first receiver module and the second receiver module.

12. The system of claim 11, wherein the hardware root of trust is a secret one-time programmably stored in at least one of the first receiver module and the second receiver module.

13. The system of claim 11, wherein:
  the first information $S_1$ is derived from a first secret one time programmably stored in the first receiver module and first deriving information.

14. The system of claim 13, wherein:
  the first deriving information comprises a plurality of receiver instructions stored in the first receiver module.

15. The system of claim 14, wherein:
  the first deriving information further comprises a key.

16. The system of claim 15, wherein:
  the key is a security provider-unique one time programmable value known only to the security provider.

17. The system of claim 13, wherein the first deriving information is remotely downloaded to the first receiver module.

18. The system of claim 11, wherein the broker provides a first encrypted version of a different pairing key for each service requested from the one of the plurality of broadcasters to the one of the plurality of receivers.

19. The system of claim 11, wherein the broker provides a first encrypted version of the same pairing key for every service requested from the one of the plurality of broadcasters to the one of the plurality of receivers.

20. The system of claim 11, wherein:
  the first receiver module receives the first encrypted version $E_{S_1}[K_p]$ of the pairing key $K_p$ and a second encrypted version of the pairing key $E_{S_2}[K_p]$ from the one of the plurality of broadcasters, the second encrypted version of the pairing key $E_{S_2}[K_p]$ being generated by the one of the plurality of broadcasters and decryptable by second information $S_2$ stored in the second receiver module.

21. An apparatus for brokering an enabling of communication of encrypted media programs from a plurality of independent broadcasters to a plurality of receivers, each encrypted media program decryptable by a first receiver module securely communicating with a second receiver module according to a pairing key associated with one of the plurality of receivers, the apparatus comprising:
  means for transmitting a service enabling request from one of the plurality of broadcasters to a broker independent from the one of the plurality of broadcasters, the request comprising an identification of the one of the plurality of receivers;
  means for receiving a first encrypted version of the pairing key $E_{S_1}[K_p]$ from the broker, the first encrypted version of the pairing key $E_{S_1}[K_p]$ decryptable by first information $S_1$ securely stored in the first receiver module of the one of the plurality of receivers;
  means for encrypting the pairing key with second information $S_2$ to generate a second encrypted version of the pairing key $K_p$, the second encrypted version of the pairing key $E_{S_2}[K_p]$ decryptable by the second information $S_2$ securely stored in the second receiver module; and
  means for transmitting the first encrypted version of the pairing key $E_{S_1}[K_p]$ and the second encrypted version of the pairing key $E_{S_2}[K_p]$ to the one of the plurality of receivers;
  wherein at least one of the first information $S_1$ and the second information $S_2$ is derived from a hardware root of trust stored in at least one of the first receiver module and the second receiver module.

22. The apparatus of claim 21, wherein the hardware root of trust is a secret one-time programmably stored in at least one of the first receiver module and the second receiver module.

23. The apparatus of claim 21, wherein:
  the first information $S_1$ is derived from a first secret one time programmably stored in the first receiver module and first deriving information.

24. The apparatus of claim 23, wherein:
  the first deriving information comprises a plurality of instructions stored in the first receiver module.

25. The apparatus of claim 24, wherein:
  the first deriving information further comprises a key.

26. The apparatus of claim 25, wherein:
  the key is a security provider-unique one time programmable value known only to the security provider.

27. The apparatus of claim 23, wherein the first deriving information is remotely downloaded to the first receiver module.

28. The apparatus of claim 21, wherein at least one of the encrypted media programs is encrypted according to an encrypted control word E[CW], and the apparatus further comprises:

means for decrypting the first encrypted version of the pairing key $E_{S_2}[K_p]$ in the first receiver module;

means for decrypting the second encrypted version of the pairing key $E_{S_2}[K_p]$ in the second receiver module;

means for decrypting the encrypted control word E[CW] in the second receiver module;

means for re-encrypting the decrypted control word CW according to the decrypted second encrypted version of the pairing key;

means for providing the re-encrypted control word $E_{K_p}$[CW] from the second receiver module to the first receiver module; and means for decrypting the re-encrypted control word $E_{K_p}$[CW] using the decrypted first encrypted version of the pairing key $K_p$.

29. The apparatus of claim 21, wherein the first service enabling request is for one service from the one of the plurality of broadcasters.

30. The apparatus of claim 21, wherein the first service enabling request is for a plurality of services from the one of the plurality of broadcasters.

* * * * *